United States Patent
Hediger et al.

[11] Patent Number: 6,124,653
[45] Date of Patent: Sep. 26, 2000

[54] OVERFLOW DUCTS OF A GENERATOR WITH DIRECT INDUCED-DRAFT COOLING

[75] Inventors: Daniel Hediger, Othmarsingen; Gianfranco Guerra, Birr, both of Switzerland

[73] Assignee: Asea Brown Boveri AG, Baden, Switzerland

[21] Appl. No.: 09/294,020

[22] Filed: Apr. 19, 1999

[30] Foreign Application Priority Data

Apr. 23, 1998 [DE] Germany .................. 198 18 149

[51] Int. Cl.[7] .................................................. H02K 9/00
[52] U.S. Cl. .................................. 310/59; 310/62; 310/63
[58] Field of Search .............................. 310/57–59, 55, 310/62, 64, 63

[56] References Cited

U.S. PATENT DOCUMENTS

| | | | |
|---|---|---|---|
| 1,672,680 | 6/1928 | Freiburgthouse | 310/57 |
| 3,091,710 | 5/1963 | Shartrand et al. | 310/57 |
| 3,652,881 | 3/1972 | Albright et al. | 310/57 |
| 3,739,208 | 6/1973 | Shartrand | 310/58 |
| 3,809,934 | 5/1974 | Baer et al. | 310/53 |
| 4,141,669 | 2/1979 | Darby et al. | 310/59 |
| 5,652,469 | 7/1997 | Boardman et al. | 310/58 |
| 5,883,448 | 3/1999 | Zimmermann | 310/52 |

*Primary Examiner*—Nestor Ramirez
*Assistant Examiner*—Joseph Waks
*Attorney, Agent, or Firm*—Burns, Doane, Swecker & Mathis, L.L.P.

[57] ABSTRACT

In a generator which is operated according to the induced-draft-cooling principle and in which a main fan (11), attached to the rotor shaft (12) of the generator, draws cooling medium, which is heated by the heat-generating elements of the generator, out of the generator and transports it essentially perpendicularly to the axis of this rotor shaft (12) to a cooling arrangement (23), the drawn-in cooling medium, which is expelled with a swirl at high velocity by the main fan (11), being received by a cooling-duct casing (33), which directs the cooling medium to the cooling arrangement (23) via at least one fluidic constriction (41), the directing of the cooling medium, while efficiently avoiding vortices and pressure drops, is achieved in that the cooling-duct casing (33) has at least one overflow duct (66), which receives the cooling medium, expelled into the cooling-duct casing (33) by the main fan (11), via an inflow zone (58) upstream of the constriction (41), diverts the cooling medium around the constriction (41) and directs it to an outflow zone (59) lying downstream of the constriction (41) in the direction of flow, where the cooling medium flows into the cooling-duct casing (33) again.

10 Claims, 5 Drawing Sheets

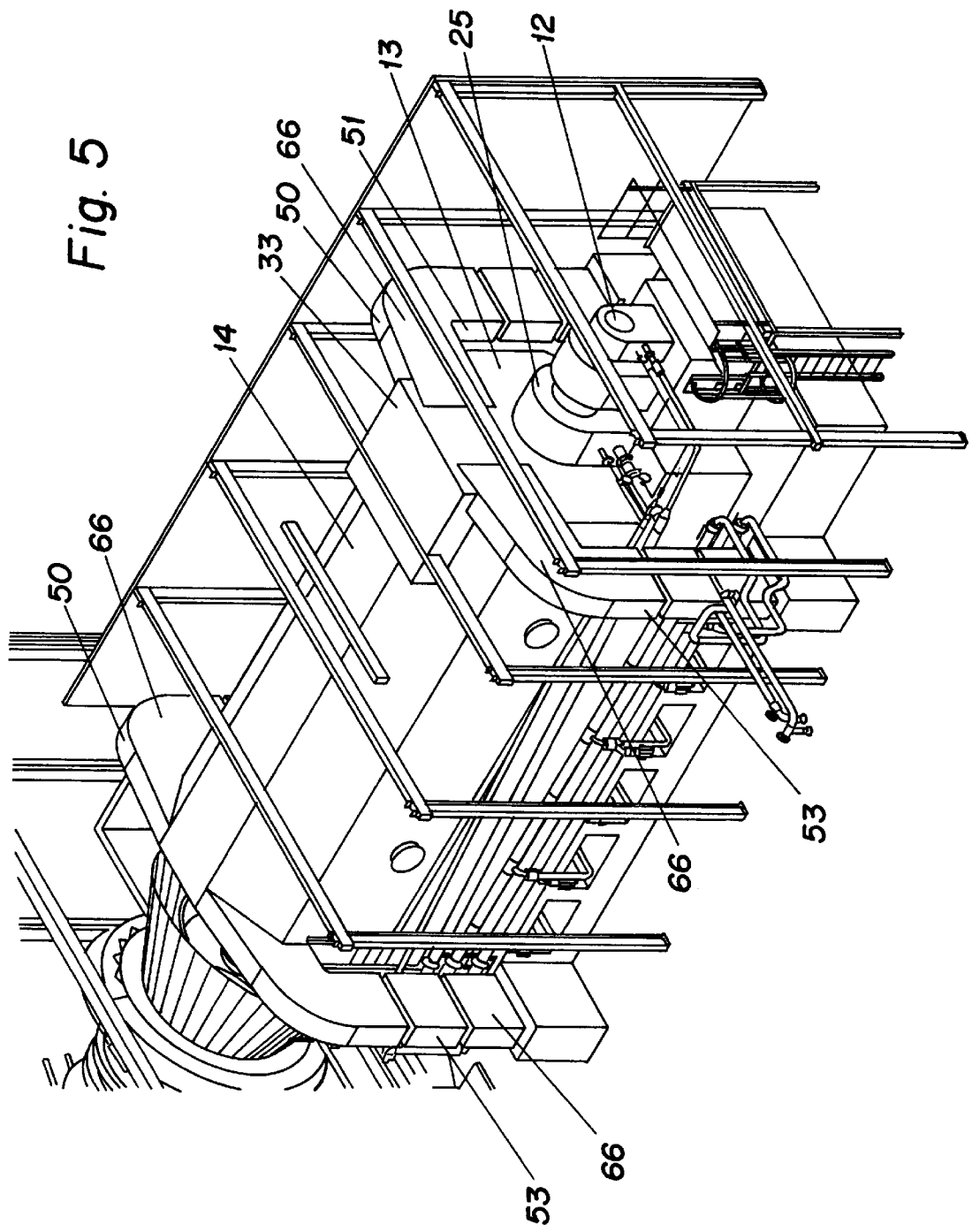

OVERFLOW DUCTS OF A GENERATOR WITH DIRECT INDUCED-DRAFT COOLING

BACKGROUND OF THE INVENTION

1. Field of the Invention

The present invention relates to the field of generators. It relates to a generator which is operated according to the induced-draft-cooling principle and in which a main fan, attached to the rotor shaft of the generator, draws cooling medium, which is heated by the heat-generating elements of the generator, out of the generator and transports it essentially perpendicularly to the axis of this rotor shaft to a cooling arrangement, the drawn-in cooling medium, which is expelled with a swirl at high velocity by the main fan, being received by a cooling-duct casing, which directs the cooling medium to the cooling arrangement via at least one fluidic constriction.

2. Discussion of Background

In generators which are operated according to the induced-draft-cooling principle, the cooling medium heated by the heat-generating elements of the generator is drawn out of the generator by main fans fastened to the rotor shaft. These main fans are normally arranged at the front end and rear of the generator, and a duct system directs the cooling medium blown out by the main fans to a cooling arrangement, which usually lies under the generator, in a foundation pit. Heat is then extracted from the cooling medium when flowing through the cooling arrangement, extending essentially over the entire length of the generator, and the cold medium, in a ducted manner over the entire length, thereupon passes into the interior of the generator again to the heatgenerating elements, hence forming a closed cooling circuit.

In order to meet the present requirements for the cooling of rotors in limit-rating machines, increasingly efficient and increasingly loss-free ducting of the cooling-medium flows is indispensible. A critical location for the cooling-medium flows is in the head-side and front-end regions, where the main fans draw the heated cooling medium out of the generator interior space. There, the hot cooling medium enters a cooling duct with a high swirl and at a high velocity, the task of this cooling duct being to duct the cooling medium downward to the cooling arrangement. So as not to unnecessarily increase the generator length, this cooling duct is to be kept as narrow as possible. The flow drawn out of the generator interior space by the main fan can be split into two components. The cooling medium flows out of the generator interior space parallel to the rotor shaft; in addition, however, the cooling medium is also set in rotation by the main fan. The cooling duct deflects this swirled flow perpendicularly to the rotor shaft and collects the flow, fanned out perpendicularly to the rotor shaft in all directions, in one direction, namely downward.

In this case, the deflection of the cooling-medium flow into the circular-symmetrical fantail perpendicularly to the rotor shaft is usually assisted by a so-called plate diffuser. This plate diffuser is essentially a tube which encloses the main fan and opens in a trumpet shape downstream of the fan in the direction of flow to form a plane circular ring lying perpendicularly to the rotor shaft and parallel to the front end of the generator. As a result, the cooling medium is ducted directly at the main fan and is then fanned out in a controlled manner. The cooling-duct casing is normally designed in the same way as the casing of the generator and encloses the cooling duct essentially in a circle, leaving open that side which leads into the foundation pit, so that the cooling medium can flow away downward.

A problem with this ducting of the cooling-medium flow, as things stand, is that at least one constriction occurs in the cooling-medium flow. This is because the entire cooling-medium flow expelled upward and laterally by the fan must, since it is swirled, flow through one zone in the cooling duct. In this zone, the constriction, which lies at the bottom just upstream of the opening of the cooling-duct casing in the direction of flow, vortices and flow separations of the cooling medium occur as a result of the high velocities. The pressure drops associated therewith reduce the efficiency of the rate of flow of the cooling medium in an unacceptable manner.

SUMMARY OF THE INVENTION

Accordingly, one object of the invention is to provide ducting of the cooling-medium flow from the main fan to the cooling arrangement, which ducting:

- reduces the high cooling-medium velocities at the constriction and evens out the flow,
- permits a compact type of construction in the axial direction of the generator (short length of machine house),
- produces low mechanical stresses in the rotor (short distances between bearings),
- provides better means of influencing the rotor dynamics (variation of distances between bearings and/or shaft-neck diameters).

This object is achieved in a generator of the type mentioned at the beginning in that the cooling-duct casing has at least one overflow duct, which receives the cooling medium, expelled into the cooling-duct casing by the main fan, via an inflow zone upstream of the constriction, diverts the cooling medium around the constriction and directs it to an outflow zone lying downstream of the constriction in the direction of flow, where the cooling medium flows into the cooling-duct casing again.

Further embodiments follow from the dependent claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 5 shows a generator with a cooling-duct casing having external overflow ducts, in a perspective view.

DESCRIPTION OF THE PREFERRED EMBODIMENTS

Figure 1:
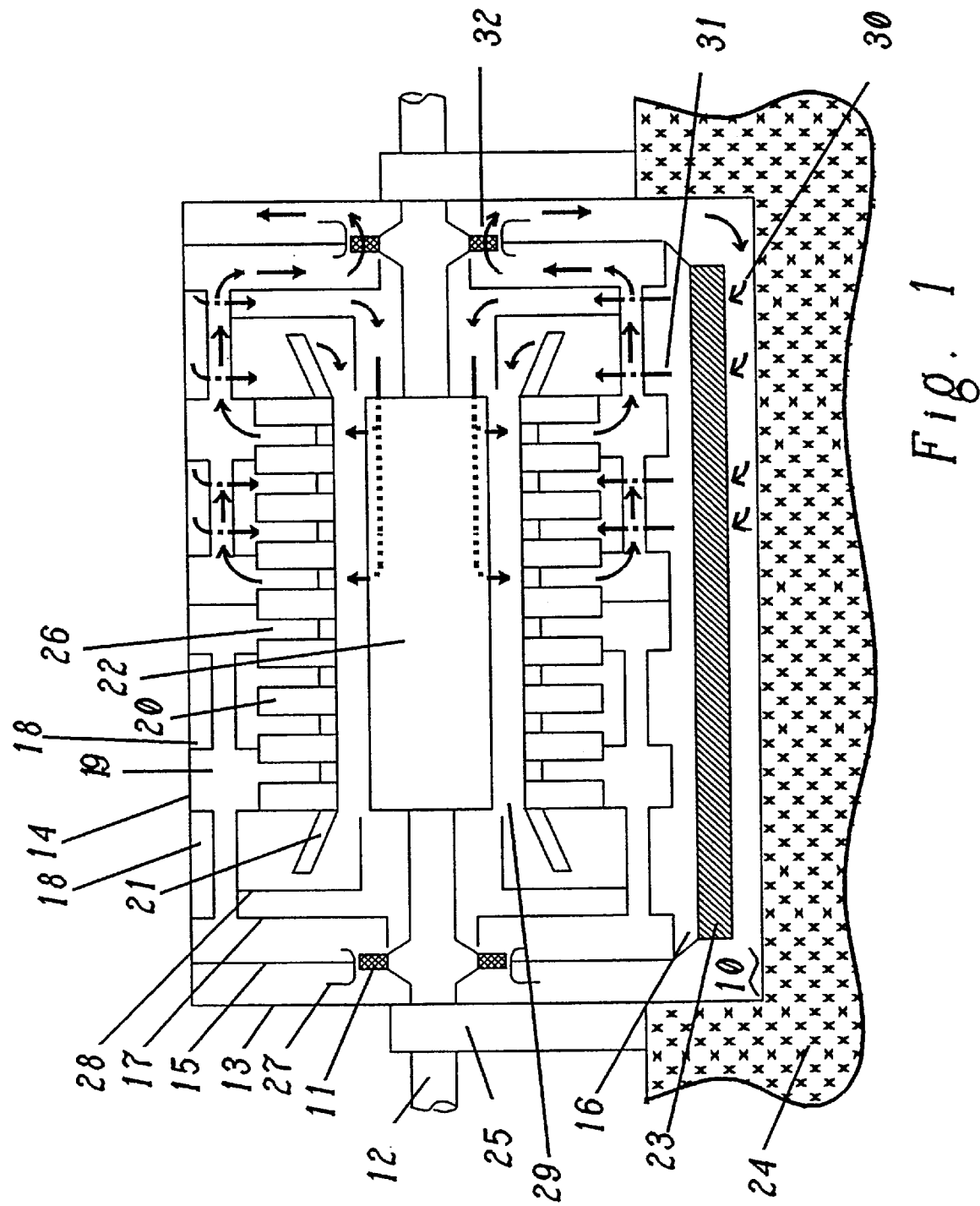
FIG. 1 shows a schematic representation of a generator with induced-draft-cooling principle.

Referring now to the drawing, wherein like reference numerals designate identical or corresponding parts throughout the several views, FIG. 1 shows a schematic longitudinal section through a generator operated according to the induced-draft-cooling principle. The generator is defined at the front end and at the rear by machine-casing covers 13 and is enclosed longitudinally by a cylindrical machine casing 14. The casing encloses a laminated stator body, which is formed from sectional laminations 20 and in which there are radial ventilation slots 26 between the various sectional laminations 20. A rotor 22 is located in the center of the laminated stator body, and the associated rotor shaft 12 is mounted in pedestal bearings 25, which rest on the foundation 24.

The foundation 24 has a foundation pit 10, which extends axially over the entire length of the machine casing 14 and occupies essentially the entire width of the machine casing 14. A cooling arrangement 23 of the generator is arranged in this foundation pit 10. In this case, the inlet openings of the cooling arrangement 23 are connected to outflow spaces of main fans 11 arranged on either side of the rotor 22, and the outlet openings of the cooling arrangement 23 lead into a compensating space 16. The main fan 11 in this case is firmly connected to the rotor shaft 12 and rotates at the same speed as the rotor 22. The flow paths of the cooling gas flowing through the generator are indicated by arrows. The cooling circuit is indicated only in one machine half, since the flow behavior is essentially symmetrical.

The present cooling principle involves so-called reverse or induced-draft cooling, in which hot gas 30, 32 is fed to the cooling arrangement 23 by means of fans 11. Downstream of the cooling arrangement 23 in the direction of flow, the cold cooling-gas flow 31 is distributed in the compensating space 16 among the cold-gas chambers 18, in the course of which partial flows form. A first partial flow flows between baffles 28 and an inner panel 17 directly to the rotor 22, a second partial flow flows through the winding overhang 21 into the machine air gap 29 between rotor and stator, and a third cooling-gas flow passes through the cold-gas chambers 18 and ventilation slots 26 into the machine air gap 29. The cooling-gas flow is drawn out of the machine air gap 29 by the main fans 11 through ventilation slots 26 and the hot-gas chambers 19 between the inner panel 17 and an outer panel 15. The air 32 driven by the main fan 11 is then deflected by a plate diffuser 27 and directed by the cooling-duct casing 33 into the foundation pit 10 to the cooling arrangement 23.

Figure 2:
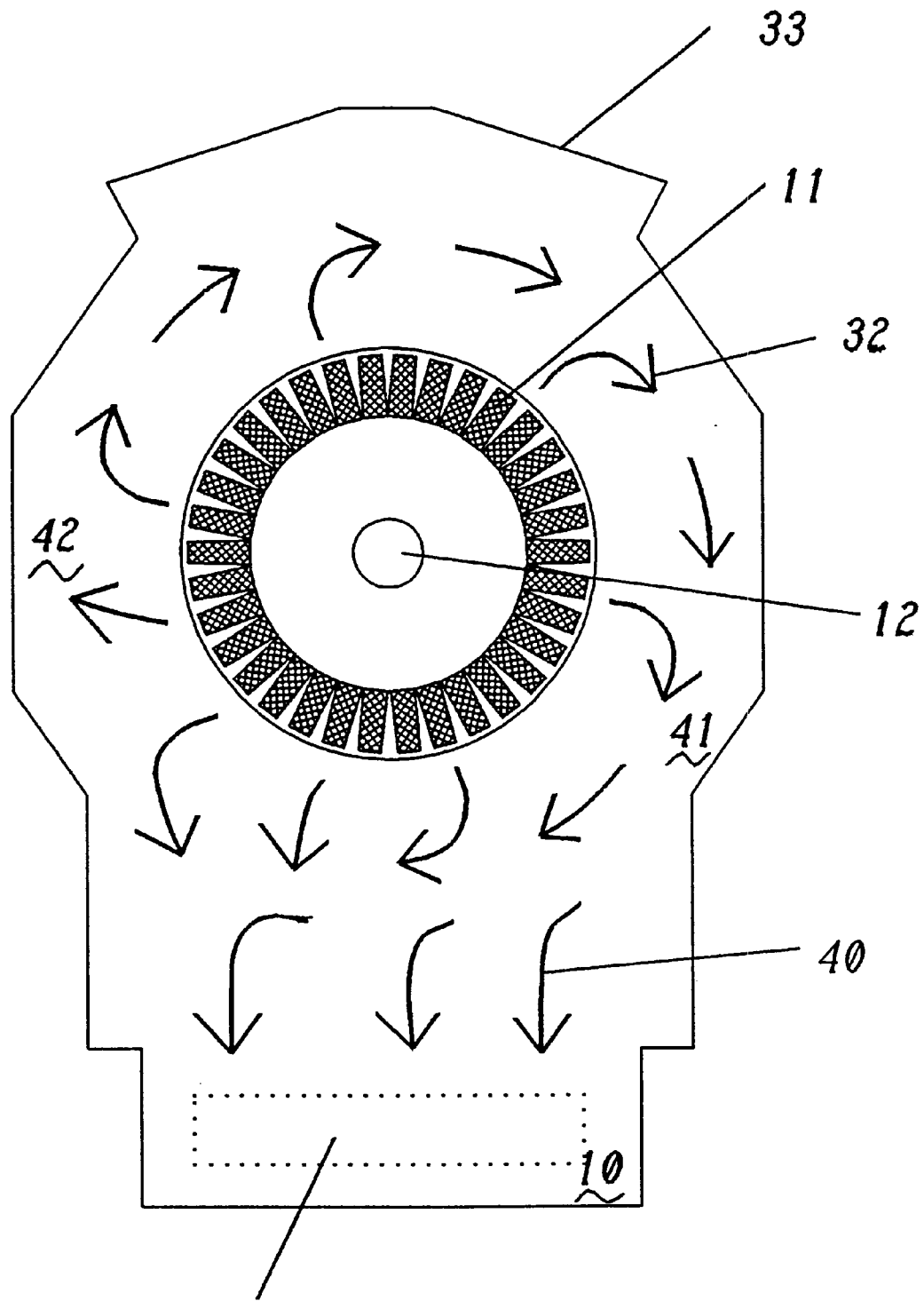
FIG. 2 shows the original concept of the cooling-duct casing.

FIG. 2, in a view against the direction of the cooling gas blown out by the main fan 11, shows a schematic section perpendicularly to the rotor shaft 12 and parallel to the machine-casing cover 13 through a cooling-duct casing 33 normally used. The main fan 11 and the rotor shaft 12 can be seen, and the foundation pit 10 and the cooling arrangement 23 are also indicated. The cooling-gas flow from the main fan 11 to the cooling arrangement 23 is again designated by arrows. In this view of the generator, the main fan 11 rotates clockwise. The cooling-gas flow 32 leaves the main fan 11 with a clockwise swirl, the result of which is that cooling gas which discharges above a vortex point 42 (>8 o'clock) is driven through the entire top part of the cooling-duct casing 33 before it passes downward into the foundation pit 10, and only the cooling gas expelled in a small discharge sector (6 to 8 o'clock) passes directly downward as it were. This flow-and swirl-induced collecting of the cooling gas leads to a situation in which essentially two thirds of the cooling gas expelled by the main fan 11 has to pass through a constriction 41. This leads to excessive flow velocities of the cooling gas at this constriction 41 and thus chiefly to flow separation and pressure losses. These pressure losses severely reduce the rate of flow of the cooling medium and thus reduce the efficiency of the induced-draft cooling.

Figure 3:
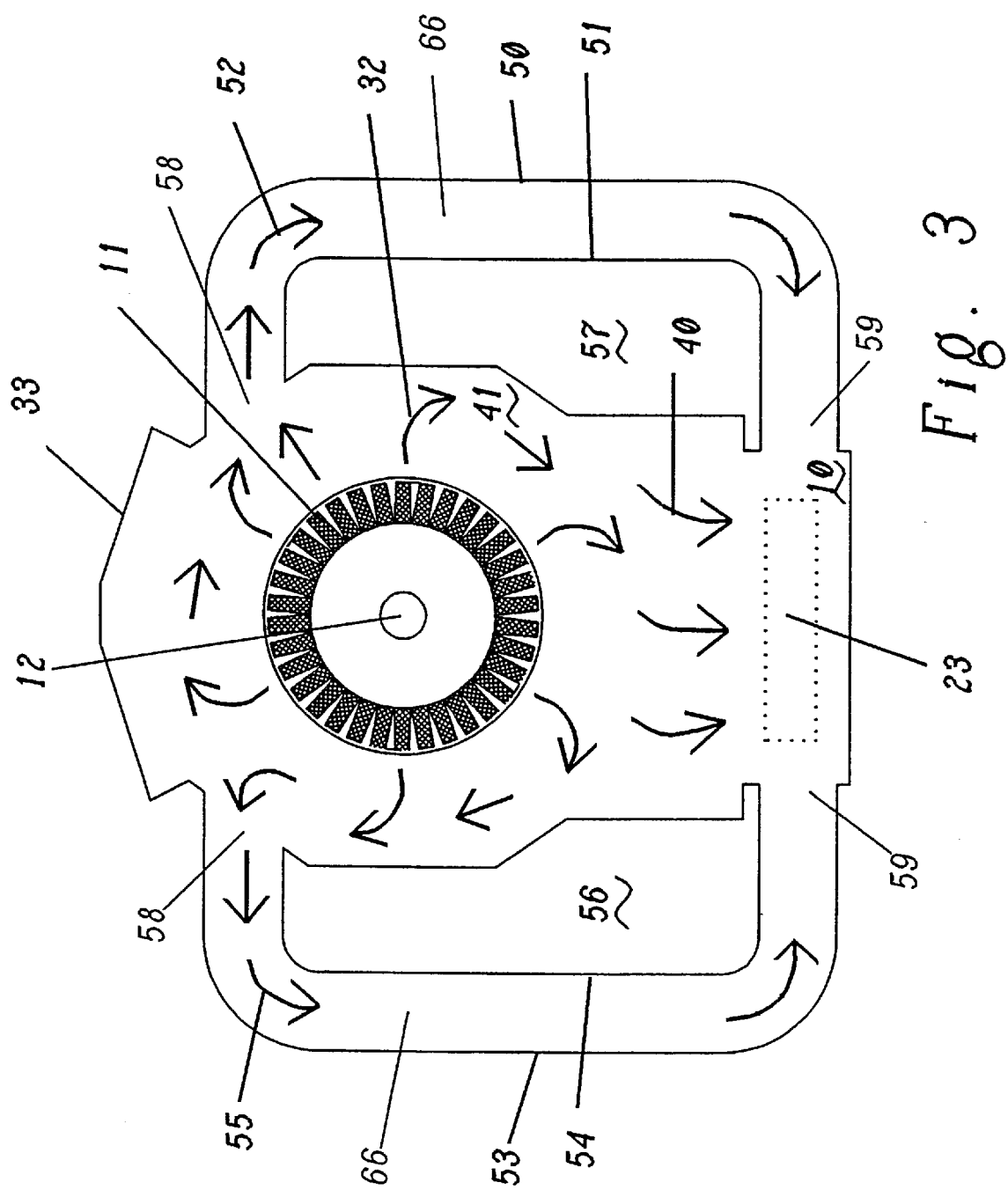
FIG. 3 shows a cooling-duct casing having external overflow ducts.

FIG. 3 shows a schematic section, analogous to FIG. 2, through a cooling-gas duct 33 according to the invention of the first exemplary embodiment. The cooling-gas duct 33 normally used and indicated in FIG. 2 is widened here by two overflow ducts 66 arranged symmetrically on either side of the generator. As can be seen from the indicated arrows, which symbolize the flow of the cooling gas, a left-hand overflow duct 66 enables cooling gas expelled by the main fan 11 in the sector between about 8 and 11 o'clock to be received via an inflow zone 58. The cooling gas 55 which has penetrated into this inflow zone 58 is now directed downward between the inner wall 54 and the outer wall 53 of the overflow duct 66. The overflow duct 66 ends at the bottom directly in the foundation pit 10, where the cooling gas then flows out into the cooling duct via an outflow zone 59 in the vicinity of the cooling arrangement 23. This first, left-hand overflow duct therefore reduces the cooling-gas quantity which passes beforehand through the constriction 41 by approximately one third.

The cooling gas expelled in the sector between about 11 and 1 o'clock is transported downward in a similar manner in the overflow duct 66 attached symmetrically thereto on the right-hand side of the generator. The cooling gas 52 enters the overflow duct 66 via a right-hand inflow zone 58 and is directed downward between the inner wall 51 and the outer wall 50 of the duct. Via an outflow zone 59, again in the foundation pit 10, it again enters the cooling duct, in the immediate vicinity of the cooling arrangement 23. This second, right-hand overflow duct therefore reduces the cooling-gas quantity which passes beforehand through the constriction 41 by approximately a further third.

Both overflow ducts 66 thus reduce the cooling-gas quantity passing through the constriction, so that, due to the design of the cooling-duct casing according to the invention, just about one third of the gas quantity normally forced through the constriction 41 passes the latter. The cooling-gas velocities in the duct system are thus evened out and efficiency-reducing pressure drops can be prevented.

Figure 4:
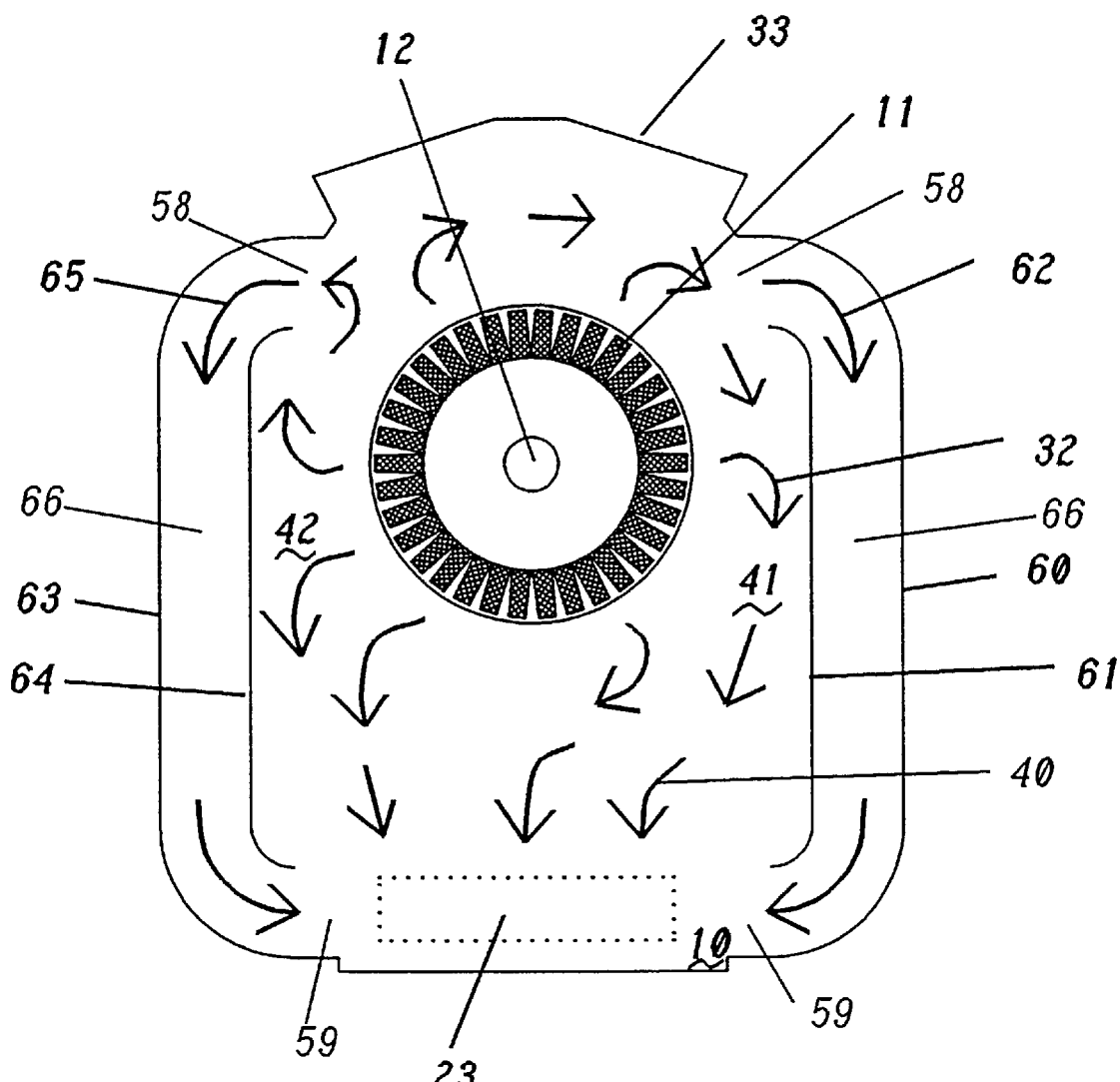
FIG. 4 shows a cooling-duct casing having internal overflow ducts.

FIG. 4 shows a further exemplary embodiment in which the analogous effect is achieved; however, the overflow ducts are not completely separated from the cooling-duct casing 33 via intermediate spaces 56, 57 but rather are designed as widened portions of the cooling-duct casing 33. In this case, the overflow ducts 66 are defined on the inside by dividing walls, which at the same time form the outer walls of the cooling-duct casing. The overflow ducts 66 again have inflow zones 58 in the top region of the cooling-duct casing 33 and outflow zones 59 which lie in the foundation pit. The flow conditions are essentially the same as described with respect to FIG. 3, only this type of construction permits a more compact arrangement in the lateral direction.

FIG. 5 shows a perspective view of the first exemplary embodiment described with respect to FIG. 3. It can be seen that such an arrangement of overflow ducts requires no widening of the machine casing in the axial direction, and that, with the machine casings normally used, the lateral widening can also be readily fitted into the general circumference of the generator. In addition, it can be seen that both cooling-duct casings 33, the front-end and the rear cooling-duct casings, are preferably provided with overflow ducts 66 in such a way that the cooling-medium flows of both generator halves are optimally directed. In the exemplary embodiment shown, the total cross section of the two overflow ducts in the top casing region is about 30%, and the duct in the bottom casing region is about 70%.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A generator including an induced-draft cooling arrangement comprising:

a rotor with a rotor shaft rotating about a rotor axis;

a cooling arrangement for cooling a cooling medium which circulates through said generator to remove heat from said generator;

a main fan attached to the rotor shaft of the generator for drawing in the cooling medium which is heated by heat-generating elements of the generator and for drawing the cooling medium away from the generator substantially perpendicularly to the axis of the rotor shaft to the cooling arrangement;

whereby the drawn-in cooling medium is expelled with a swirl at high velocity by the main fan and is received by a cooling-duct casing which directs a first quantity of the cooling medium to the cooling arrangement via at least one fluidic constriction;

the cooling-duct casing having at least one bypass duct which receives a second quantity of the cooling medium expelled into the cooling-duct casing by the main fan upstream of the fluidic constriction diverts the second quantity of the cooling medium around the fluidic constriction and directs the second quantity of the cooling medium to at least one outflow zone lying downstream of the fluidic constriction and upstream of the cooling arrangement.

2. The generator as claimed in claim 1, wherein the cooling medium drawn away from the generator by the main fan is ducted parallel to the rotor shaft by a circular plate diffuser and is then deflected into the cooling-duct casing perpendicularly to the rotor shaft such that vortices are prevented.

3. The generator as claimed in claim 1, wherein both the cooling-duct casing and the at least one overflow duct lie in a common plane perpendicularly to the axis of the rotor shaft.

4. The generator as claimed in claim 1, wherein the cooling arrangement is arranged at a location below the generator, and wherein the cooling medium is directed downward by the cooling-duct casing.

5. The generator as claimed in claim 4, wherein the cooling arrangement is arranged in a foundation pit of the generator.

6. The generator as claimed in claim 5, wherein the at least one inflow zone of the at least one overflow duct lie in a top region of the cooling-duct casing, and wherein the at least one outflow zone is arranged in the bottom region of the foundation pit of the generator.

7. The generator as claimed in claim 6, wherein two overflow ducts are formed, and the two overflow ducts are arranged substantially symmetrically around both sides of a longitudinal axis of the generator.

8. The generator as claimed in claim 7, wherein the two overflow ducts run laterally in a radial direction around the cooling-duct casing a radially lateral outside of the generator by outer walls and on a radially inner side facing the cooling-duct casing by inner walls, forming intermediate spaces, and wherein the two overflow ducts receive the another quantity of cooling medium which has been expelled by the main fan into the top part of the cooling-duct casing via the top inflow zone and directs the another quantity of cooling medium downward into the foundation pit where the cooling medium is fed to the cooling arrangement via the at least one outflow zone.

9. The generator as claimed in claim 8, wherein the two overflow ducts laterally widen the cooling-duct casing in the radial direction and are defined on the radially lateral outside of the generator by outer walls and on the radially inner side facing the main fan by dividing walls which form the lateral walls of the cooling-duct casing and wherein the two overflow ducts receive the another quantity of cooling medium which has been expelled by the main fan into the top part of the cooling-duct casing via the top inflow zone and directs the another quantity of cooling medium downward into the foundation pit where the cooling medium is fed to the cooling arrangement via the at least one outflow zone.

10. The generator as claimed in claim 1, wherein air is used as the cooling medium.

* * * * *